(12) United States Patent
Sauer et al.

(10) Patent No.: US 8,080,076 B2
(45) Date of Patent: Dec. 20, 2011

(54) NONWOVEN LAYER FOR A FILTER AND FILTER MEDIUM

(75) Inventors: Ralf Sauer, Overpelt (BE); Jan Schultink, Overpelt (BE)

(73) Assignee: Eurofilters N.V., Overpelt (BE)

( * ) Notice: Subject to any disclaimer, the term of this patent is extended or adjusted under 35 U.S.C. 154(b) by 830 days.

(21) Appl. No.: 10/537,641

(22) PCT Filed: Dec. 8, 2003

(86) PCT No.: PCT/EP03/13901
§ 371 (c)(1),
(2), (4) Date: Nov. 9, 2005

(87) PCT Pub. No.: WO2004/052500
PCT Pub. Date: Jun. 24, 2004

(65) Prior Publication Data
US 2006/0144024 A1   Jul. 6, 2006

(30) Foreign Application Priority Data

Dec. 6, 2002  (EP) .................................... 02027313
Apr. 4, 2003  (EP) .................................... 03007788

(51) Int. Cl.
*B01D 46/00* (2006.01)
(52) U.S. Cl. ............... 55/381; 55/382; 55/482; 55/486
(58) Field of Classification Search ............ 55/382, 55/482, 486, 381
See application file for complete search history.

(56) References Cited

U.S. PATENT DOCUMENTS

| | | | | |
|---|---|---|---|---|
| 2,792,076 A | * | 5/1957 | Meyerhoefer | 55/381 |
| 2,848,062 A | * | 8/1958 | Meyerhoefer | 55/367 |
| 3,498,031 A | * | 3/1970 | Fesco | 55/368 |
| 4,663,222 A | * | 5/1987 | Ohue et al. | 442/35 |
| 4,877,526 A | * | 10/1989 | Johnson et al. | 210/448 |
| 4,941,309 A | * | 7/1990 | Fluent et al. | 53/544 |
| 5,203,061 A | * | 4/1993 | Hamada | 29/33 M |
| 5,206,061 A | * | 4/1993 | Ando et al. | 428/34.7 |
| 5,855,992 A | | 1/1999 | Etzold | |
| 6,193,773 B1 | | 2/2001 | Schlör et al. | |
| 6,425,978 B1 | * | 7/2002 | Diehl et al. | 162/125 |
| 2008/0011034 A1 | * | 1/2008 | Hochrein et al. | 71/9 |

FOREIGN PATENT DOCUMENTS

| | | |
|---|---|---|
| EP | 0 338 479 A1 | 4/1989 |
| 5,707,468 | A * 1/1998 Arnold et al. | 156/62.6 |
| EP | 0 960 645 A2 | 12/1999 |
| WO | WO 93/21812 * | 11/1993 |
| WO | WO 01/12427 | 2/2001 |

OTHER PUBLICATIONS

Karger-Kocsis, J. (1999). Polypropylene—An A-Z Reference. (pp. 301-303). Springer-Verlag.*
Subhash Chand, Gajanan S. Bhat, Joseph E. Spruiell, Sanjiv Malkan. Structure and properties of polypropylene fibers during thermal bonding—Thermochimica Acta 367-368 (2001) 155-160.*
Ward (Micro Denier Nonwoven Process and Fabrics) 1998.*
Webster's Third New International Dictionary, Unabridged, 1993.*
International Search Report Dated Apr. 28, 2004.

* cited by examiner

*Primary Examiner* — Jason M Greene
*Assistant Examiner* — Anthony Shumate
(74) *Attorney, Agent, or Firm* — Brinks Hofer Gilson & Lione

(57) ABSTRACT

The invention is directed to a nonwoven layer for a filter, in particular, for a vacuum cleaner bag, wherein at least one region of the nonwoven layer, the region having a predetermined thickness and a predetermined area, has an average pore size smaller than 50 μm and comprises fibers being bonded together such that a movement of the fibers relative to each other in a direction parallel to the surface of the layer is inhibited. The invention is further directed to a filter medium, in particular, for a vacuum cleaner bag, comprising a filter structure wherein a surface or an interface of the filter structure is provided with a filter paper layer having a smaller surface area than the filter structure.

3 Claims, 2 Drawing Sheets

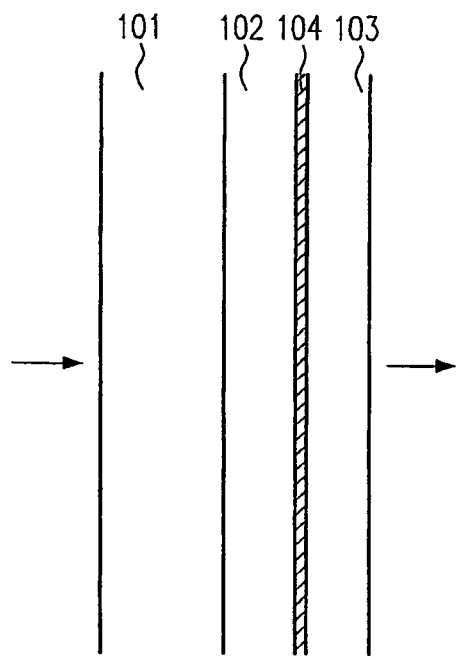
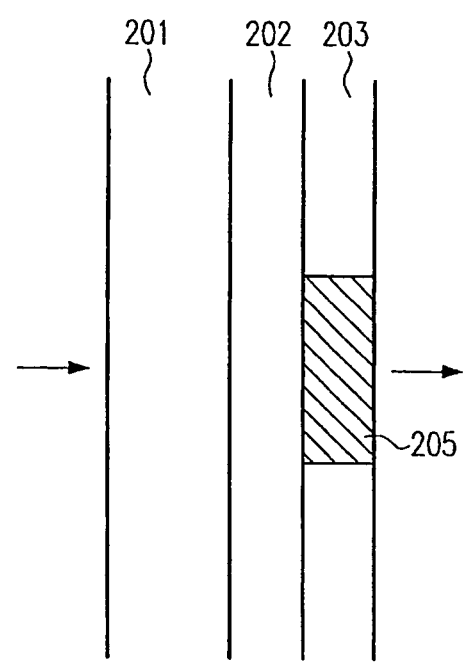
Fig.1　　　　　　　　Fig.2
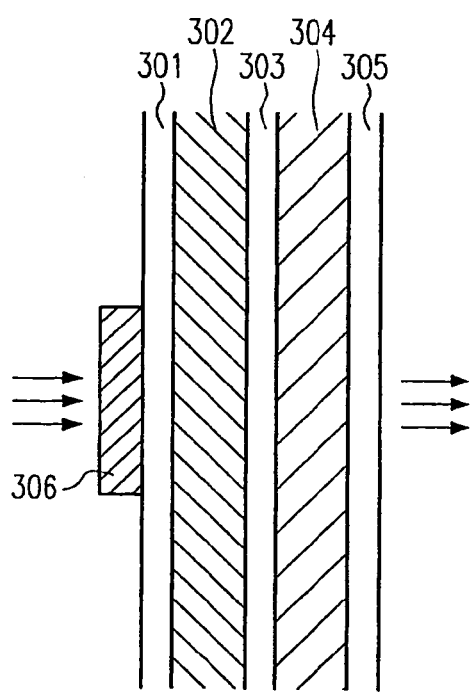
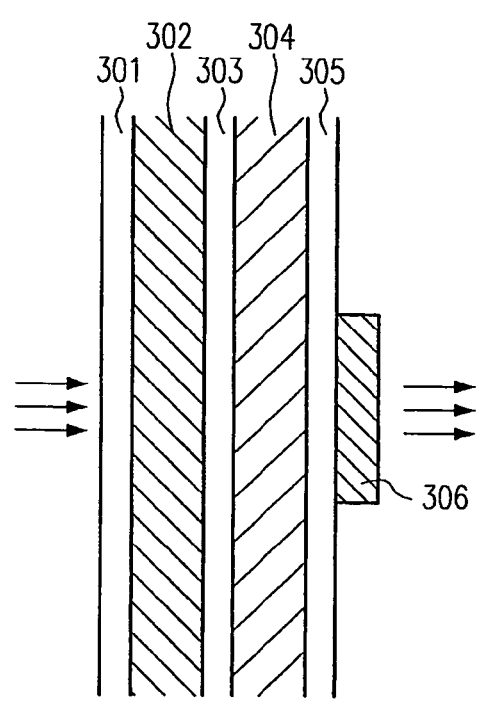
Fig.3A　　　　　　　　Fig.3B

NONWOVEN LAYER FOR A FILTER AND FILTER MEDIUM

This application is the National Stage of International Application No. PCT/EP2003/013901, filed Dec. 8, 2003, which claims priority to European Patent Application Nos. EP 03007788.7, filed Apr. 4, 2003 and EP 02027313.2, filed Dec. 6, 2002, these references are incorporated herein in their entirety.

The invention is directed to a nonwoven layer for a filter and to a filter medium, in particular, for a vacuum cleaner bag.

Nowadays, many vacuum cleaner bags comprise filter structures that are composites of nonwoven materials instead of conventional filter paper, these composite materials showing a high filtration efficiency and capacity.

EP 0 960 645 discloses such a prior art vacuum cleaner bag. This prior art construction is made of three layers, namely, in the direction of the air flow, a bulky meltblown, a (filtration grade) meltblown fleece and a spunbond or spunlace layer. The upstream bulky meltblown layer which will be located at the inner side of the bag serves to remove large amounts of dust particles, to hold the dust in its structure, and to protect the meltblown fleece from larger dust particles.

The prior art filter structures have a high filtration efficiency. However, it turned out in practice that elongated particles or objects with small diameters such as hairs (having a diameter of about 70.2±12.3 µm) tend to penetrate the filter. This penetration mainly occurs in the region where the airflow of the vacuum cleaner meets the wall of the filter bag. The elongated objects act like spears and pierce the filter structure. Although these elongated objects usually do not exit the filter bag, many of them stick out of the outermost layer of the bag. Therefore, these objects are visible from the outside, which is aesthetically disturbing.

In view of this, it is the problem underlying the invention to provide a material that is suitable for use in a filter and a filter medium, in particular, for a vacuum cleaner bag, that has a better retention regarding elongated particles and objects.

This problem is solved by a nonwoven layer for a filter comprising the features of claim 1. Accordingly, the invention provides a nonwoven layer for a filter, in particular, for a vacuum cleaner bag, wherein at least one region of the nonwoven layer, the region having a predetermined thickness and a predetermined area, has an average pore size smaller than 50 µm and comprises fibers being bonded together such that a movement of the fibers relative to each other in a direction parallel to the surface of the layer is inhibited.

Surprisingly, it was found that a nonwoven layer having these features reduces the above-mentioned problem of penetration while maintaining a desired air permeability to a high degree. The at least one region can be chosen so as to correspond only to the area where a stream of air meets the nonwoven layer. Alternatively, the at least one region can be the whole area of the nonwoven layer. The thickness of the region may range from a thickness of the order of magnitude of one fiber diameter up to the total thickness of the nonwoven layer.

Such a bonding of the fibers has the effect that an elongated object striking the nonwoven layer is inhibited or even prevented of displacing the fibers in a direction parallel to the surface of the layer. This would happen with loose fibers that are not bonded in such a way. Therefore, the penetration of the elongated objects is reduced or prevented.

However, it is not necessary that two fibers are bonded to one another at each point where they are touching or crossing each other. In some cases it is also sufficient if the fibers are bonded only at some crossing points.

According to a preferred embodiment, the nonwoven layer can be an airlaid and/or a carded nonwoven layer, a spunbond or spunlace nonwoven layer or a meltblown nonwoven layer.

Advantageously, any of the above-described nonwoven layers can have a basis weight between 10 and 100 $g/m^2$ and the spunbond or spunlace fibers can have an average fineness of 0.6 to 12 denier, the meltblown fibers can have an average diameter of 1 µm to 15 µm and the carded fibers can have an average fineness of 1-16.7 denier. These diameters ensure excellent filtration and air permeability properties.

According to a preferred embodiment of the above-described nonwoven layers, the at least one region can comprise an adhesive. This adhesive enables the bonding of the fibers in a very efficient manner.

According to a preferred embodiment, the adhesive can be a hot melt, a cold glue, a dry bond adhesive and/or a thermoplastic polymer, preferably a pulverized polymer. In the case of a hotmelt, preferably one additional layer covers the tacky hotmelt. An example of a thermo-plastic pulverized polymer is a pulverized polyolefin.

In an advantageous embodiment, the amount of hotmelt can be between 1 and 10 $g/m^2$. In a more preferred embodiment, the basis weight of the hotmelt is approximately 3-5 $g/m^2$. Such a basis weight guarantees, on the one hand, a high penetration reduction and, on the other hand, still sufficient air permeability.

According to an alternative advantageous embodiment, the at least one region can be a hot calendered region.

The above-described nonwoven layers can be implemented in a filter composite in form of an additional layer. Alternatively, layers already present in a filter, such as a filter layer (for example meltblown layer), a support layer (for example a spunbond layer) or the like can be provided with fibers bonded together such that the movement of the fibers is inhibited.

The invention also provides a composite layer for a filter, in particular, for a vacuum cleaner bag comprising:
a first nonwoven layer according to one of the previously described nonwoven layers, and
a second nonwoven layer on top of the first nonwoven layer,
wherein an adhesive is located at an interface between the first and second nonwoven layer such that fibers of the first and/or the second nonwoven layer are bonded together and a movement of the fibers in the first and/or second nonwoven layer relative to each other in a direction parallel to the surface of the layer is inhibited.

Thus, the fibers in such a composite layer are bonded together within one layer, within each one of the layers and/or between the two layers.

According to a preferred embodiment, the first or the second nonwoven layer is a spunbond nonwoven layer, the other nonwoven layer is a meltblown nonwoven layer, and the adhesive is a hotmelt. Such a structure guarantees excellent filtration properties since the meltblown layer may act as filter and the spunbond layer may act as a support layer and the combination of both layers avoids penetrating of elongated objects through the structure.

The invention further provides a method for producing a nonwoven layer as described above comprising the step of:
treating at least on region of the nonwoven layer, the region having a predetermined thickness and a predetermined area, such that the nonwoven layer has an average pore size smaller than 50 µm and such that the fibers are bonded together and a movement of the fibers relative to each other in a direction parallel to the surface of the layer is inhibited.

According to the preferred embodiment, the treating step comprises the steps of:
spraying of hotmelt, cold glue, dry bond adhesive and/or thermoplastic polymer, preferably pulverized polymer, and
applying pressure to obtain a bonding of the fibers.

According to an alternative advantageous method, the treating step comprises the step of hot calendering.

The invention also provides a method for producing a composite layer as described above comprising the steps of:
providing a first nonwoven layer,
applying an adhesive to the first nonwoven layer, and
providing a second nonwoven layer,
wherein the adhesive is located at an interface between the first and second nonwoven layer such that fibers of the first and/or the second nonwoven layer are bonded together and a movement of the fibers in the first and/or second non-woven layer relative to each other in a direction parallel to the surface of the layer is inhibited.

According to a preferred embodiment, this method further comprises the step of applying pressure to obtain a bonding of the fibers. In this way, an improved bonding of the fibers can be obtained.

In addition, the invention provides a a filter medium, in particular, for a vacuum cleaner bag, comprising a filter structure wherein a surface or an interface of the filter structure is provided with a filter paper layer having a smaller surface area than the filter structure.

The filter structure may be constituted of a single filter layer or may comprise several adjacent layers. In a composite structure, one of the layers, for example, may function as a coarse filter whereas another layer may be responsible for filtering and holding fine dust. Of course, other multi-layer structures are also possible.

The filter paper layer can be provided at a surface of the filter structure. Alternatively, in a multi-layer structure, the filter paper layer can also be provided at an interface between two layers, i.e. at a surface of one of the layers of the structure.

The filter paper layer is to be provided at a region of the filter medium such that, in operation, an airflow to be filtered or its main or most intense part meets the filter medium, in other words, at a region that is exposed directly to the airflow to be filtered. As already pointed out before, the filter medium can be provided with the filter paper layer such that the airflow meets the filter paper layer first or, alternatively, such that the airflow is passed through one or several other layers before meeting the filter paper layer.

However, if the filter medium comprises more than one layer, the specific filtration capabilities of the different layers can exploited in an improved way if the filter paper layer is not provided between these layers but at one of the surfaces of the composite.

The filter paper layer has two functions. On the one hand, it reinforces the filter medium thereby reducing the amount of elongated particles passing through the filter medium in the region of the filter paper layer. On the other hand, due to the additional paper layer in a specific region, the air permeability of the filter medium in this region is reduced. This means that an airflow meeting the filter medium at this part of its surface is partly deviated. As a consequence, the airflow in this region is reduced and particles entrained with the airflow meet the filter with reduced velocity. In view of this, the filter has a much better retention regarding elongated particles and objects.

The filter paper layer has a smaller surface area than the filter structure in order to maintain a high air permeability of the overall filter medium. If the whole surface of the filter structure were provided with the filter paper layer, the air permeability of the filter medium would be reduced resulting in a poorer filtration efficiency. The filter paper layer can have any shape such as a curvilinear or a polygonal shape.

Preferably, the filter paper layer can be bonded to the filter structure. This ensures that the position of the filter paper layer remains constant during use of the filter medium.

According to a preferred embodiment, the filter paper layer can be bonded using an adhesive such as a hotmelt, a cold glue, a dry bond adhesive and/or a thermoplastic polymer.

Advantageously, the filter paper can be bonded to the filter structure at discrete regions. In other words, not the entire surface of the filter paper layer is bonded to the filter structure. An adhesive can be applied to the filter paper layer only at discrete regions, for example, in form of dots. In this way, the reduction of the air permeability due to bonded areas is kept small.

Preferably, the filter structure can comprise a nonwoven layer. The term "non-woven" is to be understood as excluding papers in accordance with the definition of the European Disposables and Nonwoven Association (EDANA). The nonwoven layer can be a dry-laid or a wet-laid nonwoven layer. Preferably, it can be an airlaid, a spunbond or spunlace or a meltblown layer. Alternatively or additionally, the filter structure can comprise a high dust holding capacity paper as disclosed in EP 0 960 645. The specific types of layers can be chosen so as to provide the desired filtration capabilities such as filtration efficiency and dust holding capacity.

Preferably, the filter structure can comprise at least two nonwoven layers.

In an advantageous embodiment of the above-described filter media, the filter structure can comprise a spunbond/meltblown/spunbond structure. Preferably, the filter structure can comprise successively a spunbond, an airlaid, a spunbond, a meltblown, and a spunbond layer. In this way, a highly advantageous five-layer composite with excellent filtration properties is obtained. Here, the term "successively" only specifies the order of the different layers within the filter structure. Additional layers between successive layers are possible and not excluded by this formulation; in particular, the filter paper layer can be provided at an interface between successive layers.

Preferably, the spunbond and/or the meltblown layers of the previously described filter media can comprise polypropylene (PP) fibers. The airlaid layer can comprise bi-component fibers (PP/PE) or fluff pulp fibers or a blend thereof.

According to a preferred embodiment of all previously described filter media, the filter paper layer can have an air permeability of at least about 250 $l/m^2/s$, preferably of at least about 500 $l/m^2/s$, most preferred of at least about 600 $l/m^2/s$.

As already described above, it is one object of the filter paper layer to deviate the main part of the airflow meeting the filter medium. The lower the air permeability of the filter paper layer, the more air is deviated. However, if the air permeability is too low, almost the whole airflow is deviated such that most of the airflow meets the filter medium at regions surrounding the region of the filter paper layer which results in a penetration of the elongated objects around the filter paper layer. The above lower limits for the air permeability of the filter paper layer provide excellent results regarding the retention of elongated particles.

Advantageously, the filter paper layer of the previously described filter media can have a basis weight of between 20 and 100 $g/m^2$, more preferred of between 35 and 50 $g/m^2$. These limits for the basis weight of the filter paper layer insure a highly advantageous filter quality with an improved retention of elongated particles.

The invention also provides a vacuum cleaner bag comprising one of the previously described filter media.

Preferably, the filter paper layer can be provided at a region of a surface of the filter structure such that, in operation, the region is exposed directly to an airflow entering the bag. This means that an airflow after having entered the bag is to meet the filter medium at this region.

According to an advantageous embodiment, the vacuum cleaner bag can comprise two portions of filter medium wherein both portions are bonded together at an outer edge and wherein the first portion comprises an air inlet and the second portion comprises the filter paper layer at a region opposite to the air inlet. Thus, in operation, after entering the vacuum cleaner bag through the inlet, the airflow directly (i.e. without deviations and reflections) meets the region of the filter medium that is located opposite to the inlet where the filter paper layer is provided.

The bonding of the portions of filter medium can be achieved with the help of standard methods such as ultrasonic bonding or using an adhesive, for example. The portions of filter medium can be individual filter media (for example, individual multi-layer composites) that are bonded together. Alternatively, the portions can be part of a single filter medium that is folded and, then, the edges are bonded together yielding a closed volume. For example, a rectangular filter medium can be folded such that two portions of the filter medium (again having a rectangular shape) are lying on top of each other. A bag is obtained by bonding the two portions.

Preferably, the filter paper layer can be provided at the inner surface or the outer surface of the bag. In other words, the filter paper layer advantageously is not situated at interfaces within the filter medium.

Further features and advantages of the invention are described with reference to the drawings.

FIG. 1 shows a sectional view of a first example of a composite layer in accordance with the invention;

FIG. 2 shows a sectional view of a second example of a composite layer in accordance with the invention;

FIG. 3A shows a cross-section of an example of a filter medium in accordance with the present invention;

FIG. 3B shows a cross-section of another example of a filter structure according to the present invention;

Figure 4A:
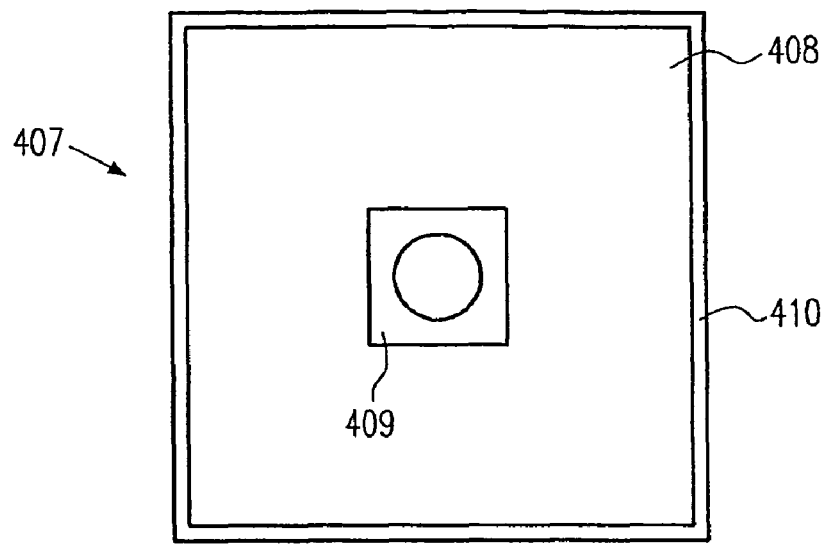
FIG. 4A shows a front view of a vacuum cleaner bag comprising a filter medium according to the present invention.

FIG. 1 shows a section of an example of a three-layer composite. The direction of the airflow is indicated by an arrow. The first upstream layer is a bulky meltblown or air laid layer 101 by a meltblown fleece 102. Downstream, the meltblown fleece 102, a spunbond layer 103 is located. At the interface between meltblown fleece 102 and spunbond layer 103, hotmelt 104 is located. Due to the hotmelt, the fibers in the spunbond layer 103 and the meltblown layer 102 are bonded together and, thus, kept in a relatively fixed position. Incoming elongated objects such as hairs may penetrate the bulky meltblown 101 and meltblown 102. At the interface between meltblown 102 and spunbond 103, the fibers within each layer and between the layers are bonded together due to the hotmelt. Due to this bonding together, the pore size in the region of the bonded fibers is less than 50 µm, preferably 15 µm. Therefore, a relative displacement of the fibers at the interface is inhibited or even prevented; a further penetration of the hairs is avoided. In this example, the treated region extends over the whole area of the nonwoven layer. The thickness of the region is very small; only fibers situated at the interface are bonded together. Thus, the thickness is of the order of magnitude of some fiber diameters. Of course, the thickness of the treated region can be increased if desired and necessary.

An alternative example is shown in FIG. 2. The structure of the composite is the same (bulky meltblown 201, meltblown fleece 202, spunbond layer 203) as in the first example. However, no hotmelt is present. Instead of the hotmelt, the spunbond 203 was hot calendered. This calendering results in a modified region 205 where the fibers are bonded together. According to a preferred embodiment, the spunbond 203 is a polypropylene having a basis weight of approximately 65 g/m$^2$ and an average fineness of about 2.5 denier or a basis weight of approximately 25 g/m$^2$ and an average fineness of about 0.9 denier. Then, preferred process parameters for the calender step are a pressure of 5 bar, a temperature of 160° C. and a speed of 10-20 m/min. In this example, only a selected area of the spunbond is treated. The thickness of the region, however, corresponds to the whole thickness of the spunbond layer 203. Therefore, in a final vacuum cleaner bag, this region preferably is to be placed where the incoming airflow strikes the bag.

It is to be understood that a nonwoven layer according to the invention can be used in other composite structures as well.

FIG. 3A shows a cross-section of a five-layer filter medium that can be used for a vacuum cleaner bag. The filter structure comprises successively a spunbond layer 301, an airlaid layer 302, a spunbond layer 303, a meltblown layer 304, and another spunbond layer 305. The direction of the airflow in operation of the filter medium is indicated by arrows. Upstream the first spunbond layer 301 of the filter medium, a filter paper layer 306 is provided. Thus, this filter paper layer 306 is provided at one of the surfaces of the five-layer composite of the filter medium. If this filter medium were used in a vacuum cleaner bag, this surface would be in fact the inner surface of the bag. As can be seen in the figure, the filter paper layer 306 has a smaller surface area than the filter structure.

An alternative example of a filter medium according to the present invention is shown in FIG. 3B. In this example, the filter medium comprises a similar five-layer composite as in FIG. 3A, in particular, also comprising a spunbond/meltblown/spunbond structure formed by layers 301, 304 and 305. In the example of FIG. 3B, the filter paper layer 306 is provided at the other surface of the five-layer composite than in FIG. 3A which would be the outer surface of the vacuum cleaner bag as can be seen from the direction of the arrows.

Figure 4B:
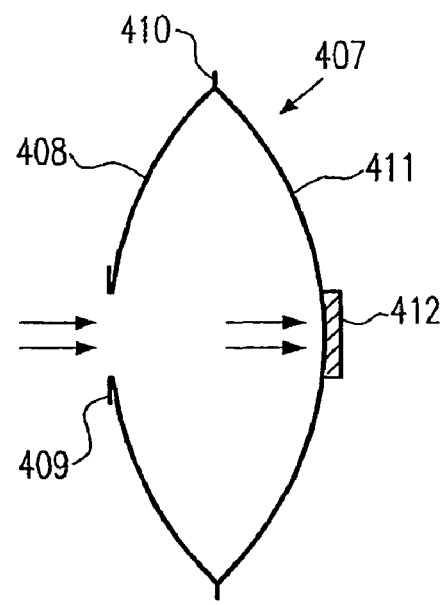
FIG. 4B shows a cross-sectional view of a vacuum cleaner bag comprising a filter medium according to the present invention.

The five-layer composite structure shown in FIG. 3A and FIG. 3B is realized in the commercially available CAPAFIL 50 (standard) vacuum cleaner bag. The shape of such a CAPAFIL 50 bag is illustrated in FIGS. 4A and 4B. In the CAPAFIL 50 bag, the inner spunbond layer 301 has a basis weight of 17 g, the airlaid layer 302 a basis weight of 50 g, the spunbond layer 303 a basis weight of 17 g, the melt-blown layer 304 a basis weight of 24 g and the outer spunbond layer 305 a basis weight of 25 g.

Such a vacuum cleaner bag was used to test the effects of the present invention. The results of these tests are shown in Table I. In these tests, a CAPAFIL 50 (290×260 mm) vacuum cleaner bag was tested in a MIELE vacuum cleaner S511 electronic. The test material was a mixture of 50 g of human hairs, 50 g of rice (dry), and 150 g of standard dust (mineral dust according to IEC 312). The test material was vacuumed and, then, the vacuum cleaner was operated for 15 minutes. After that, the number of hairs sticking out of the bag were counted. In the case of longer operation times (such as in the last two columns of Table I), the vacuum cleaner was operated several times for 15 minutes with breaks between the intervals.

In a first test, the CAPAFIL 50 vacuum cleaner bag was used without additional filter paper layer. The result is shown in the first column of Table I.

Then, quadratic filter paper layers with dimensions of 150× 150 mm with different characteristics were provided. They were positioned 45 mm from the lower edge of the bag at the center of the portion of the filter medium opposite to the portion comprising the air inlet. The filter paper layer was bonded to the five-layer composite on the inside and the outside of the bag, respectively. The following filter paper types were used.

Standard Filter Paper

As standard filter paper, VACFILT 50 MRL produced by MB Papeles Especiales, S.A. was used. According to the manufacturer's characteristics sheet, this paper has a basis weight of 50 g/m² (DIN EN ISO 536) and an air permeability of 315 l/m²/s (DIN EN ISO 9237 at 2 mbar). The test results for this paper being provided at the inside of the bag and at the outside is given in columns 2 and 3 of Table I.

FIG. 4B shows the cross-section of the bag of FIG. 4A during operation. Air (indicated by arrows) enters the bag through air inlet 409. The front and the back portions of the filter medium are curved due to the air pressure. In this figure, a filter paper layer 412 is provided at the outer surface of the back portion (outside). Alternatively, this filter paper layer can be provided inside the bag or within the filter medium (at interfaces between adjacent layers).

A quadratic filter paper layer 412 is provided. In FIG. 4B, the filter paper layer 412 is bonded to the filter medium at such a position that air entering the entrance 408 strikes the filter layer composite at the region where the filter paper layer is provided, this providing an improved retention of elongated particles being entrained with the airflow.

It is to be pointed out that the figures do not represent the dimensions correctly. Furthermore, it is to be understood that these examples serve only for illustration and are not intended as restriction. In particular, any filter layer composite can be used for the present invention. Furthermore, the vacuum cleaner bag is not restricted to a specific geometry but can have different shapes.

TABLE I

|  | without filter paper layer | Standard inside | Standard outside | VE 45 MU inside | VE 45 MU outside | VACFILT 35/7 inside | VACFILT 35/7 outside |
| --- | --- | --- | --- | --- | --- | --- | --- |
| Number of hairs (approx.) | >60 | >40 | 20–30 | >40 | 10–15 | 0 | 0 |
| Test time (min.) | 15 | 15 | 15 | 15 | 15 | 240 | 240 |

VE 45 MU Paper

Another type of paper was VE 45 MU paper produced by FiberMark Gessner. According to the manufacturers technical data sheet, this paper has a basis weight of 45 g/m² (ISO 536) and an air permeability of 400 l/m²/s (EN ISO 9237 at 200 Pa). The corresponding test results with this paper being provided at the inside of the bag and at the outside is shown in columns 4 and 5 of Table I.

VACFILT 35/7 MB

Another test paper was VACFILT 35/7 WHITE produced by MB Papeles Especiales, S.A. According to the manufacturer's specification sheet, this paper has a basis weight of 35 g/m² (DIN EN ISO 536) and an air permeability of larger than 700 l/m²/s (DIN EN ISO 9,237 at 2 mbar). The corresponding test results are shown in columns 6 and 7 of Table I.

As can be seen in column 1 of Table I, without any additional filter paper layer, after a test time of 15 minutes, the approximate number of hairs sticking out of the bag is larger than 60. Furthermore, in the case of using standard filter paper or VE 45 MU paper, the number of hairs is significantly reduced when providing the filter paper layer at the outside of the bag compared to a filter paper layer at the inside of the bag. In the case of the VACFILT 35/7 MB paper, even after 240 minutes test time, no hairs are sticking out of the bag independent of whether the filter paper layer is provided at the inside or at the outside of the bag.

FIG. 4A is a front view of a vacuum cleaner bag 407 in accordance with the present invention. The shape of the bag shown corresponds to the shape of the tested CAPAFIL 50 bag. In this figure, the front portion 408 of the filter medium is shown which is provided with an air inlet 409. Front and back portions of the filter medium are seamed together at an outer edge 410.

The invention claimed is:

1. A nonwoven layer for a filter for a vacuum cleaner bag, the non-woven layer being a spunbond nonwoven layer, wherein only a portion of said nonwoven layer is hot calendered so that an average pore size of the portion of the nonwoven layer is smaller than 50 μm, the portion of the nonwoven layer is less than the entire nonwoven layer and the portion is not an edge region of the nonwoven layer and fibers are bonded together such that a movement of the fibers relative to each other in a direction parallel to a surface of the portion of the nonwoven layer is inhibited.

2. The nonwoven layer according to claim 1, having a basis weight between 10 and 100 g/m² and wherein the spunbond fibers have an average fineness of 0.6-12 denier.

3. A method for producing a nonwoven layer for a filter wherein the nonwoven layer is a spunbond nonwoven layer and a portion of the nonwoven layer has an average pore size smaller than 50 μm and comprises fibers being bonded together such that a movement of the fibers relative to each other in a direction parallel to a surface of the portion is inhibited, the method comprising the step of:
    treating only the portion of the nonwoven layer, the treated portion having a smaller surface area than the filter such that the treated portion has an average pore size smaller than 50 μm and such that the fibers are bonded together and a movement of the fibers relative to each other in a direction parallel to the surface of the portion is inhibited, the portion of the nonwoven layer is less than the entire nonwoven layer and the portion is not an edge region of the nonwoven layer wherein the treating step comprises the step of hot calendering.

* * * * *

UNITED STATES PATENT AND TRADEMARK OFFICE
CERTIFICATE OF CORRECTION

PATENT NO. : 8,080,076 B2  
APPLICATION NO. : 10/537641  
DATED : December 20, 2011  
INVENTOR(S) : Ralf Sauer et al.

Page 1 of 1

It is certified that error appears in the above-identified patent and that said Letters Patent is hereby corrected as shown below:

In the Claims

Column 8, claim 3, line 64, immediately after "the nonwoven layer" insert --,--.

Signed and Sealed this
Nineteenth Day of June, 2012

David J. Kappos
*Director of the United States Patent and Trademark Office*